United States Patent
Winter et al.

(10) Patent No.: US 6,953,124 B2
(45) Date of Patent: Oct. 11, 2005

(54) FILTER ELEMENT WITH END FACE INLETS AND DISCHARGE OUTLETS

(75) Inventors: Manfred Winter, Oedheim (DE); Guenter Goerg, Moeglingen (DE); Ralf Poh, Schwegenheim (DE)

(73) Assignee: Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 10/465,779

(22) Filed: Jun. 20, 2003

(65) Prior Publication Data

US 2004/0060861 A1 Apr. 1, 2004

Related U.S. Application Data

(63) Continuation of application No. PCT/EP01/13401, filed on Nov. 20, 2001.

(30) Foreign Application Priority Data

Dec. 21, 2000 (DE) .......................................... 100 63 789

(51) Int. Cl.$^7$ .......................... B01D 46/52; B01D 29/07; B01D 35/30
(52) U.S. Cl. ............................ 210/445; 55/488; 55/489; 55/490; 55/498; 55/521; 210/446; 210/453; 210/492; 210/493.1; 210/493.3
(58) Field of Search ................................. 210/446, 488, 210/492, 493.1–493.5, 497.01, 497.1, 445, 450, 453; 55/485–489, 497, 498, 500, 511, 514, 521, DIG. 12, 490, 493, 483, 484

(56) References Cited

U.S. PATENT DOCUMENTS

| 3,020,977 | A |   | 2/1962 | Huppke et al. ............... 183/73 |
| 3,591,004 | A | * | 7/1971 | Roosa .......................... 210/94 |
| 4,410,427 | A | * | 10/1983 | Wydeven ..................... 210/317 |
| 4,925,561 | A | * | 5/1990 | Ishii et al. ............... 210/493.3 |
| 5,630,940 | A |   | 5/1997 | Van Rossen et al. ....... 210/484 |
| 5,804,073 | A | * | 9/1998 | Ter Horst ................ 210/493.3 |
| 6,238,561 | B1 | * | 5/2001 | Liu et al. ................. 210/493.4 |

FOREIGN PATENT DOCUMENTS

| EP | 0925818 |   | 6/1999 |
| WO | WO01301 | * | 3/1987 |
| WO | 87/01301 |   | 3/1987 |

* cited by examiner

Primary Examiner—Joseph Drodge
(74) Attorney, Agent, or Firm—Crowell & Moring LLP

(57) ABSTRACT

A filter element for end face inlet formed of triangular channels which are alternately closed such that the fluid to be filtered must pass through the filter material in order to flow from the inlet side (22) to the discharge side (23). The channels are formed by alternating flat layers (17) and folded layers (18), whereby all sides of the inlet channels face a discharge channel. A particularly high filter efficiency is thereby achieved such that a large filter surface area and a high filter capacity are attained with a relatively small structural volume. The filter can be used, for example, as an air filter for various air filtration applications.

8 Claims, 2 Drawing Sheets

FILTER ELEMENT WITH END FACE INLETS AND DISCHARGE OUTLETS

CROSS REFERENCE TO RELATED APPLICATIONS

This application is a continuation of international patent application no. PCT/EP01/13401, filed Nov. 20, 2001, designating the United States of America, and published in German as WO 02/49741, the entire disclosure of which is incorporated herein by reference. Priority is claimed based on Federal Republic of Germany patent application no. DE 100 63 789.2, filed Dec. 24, 2000.

BACKGROUND OF THE INVENTION

The invention relates to a filter element for end face inflow, comprising alternating flat layers and folded layers which form channels having a triangular cross section, in which the channels are alternately sealed at one end or the other so that the fluid to be filtered must flow through the filter medium. The invention further relates to a filter in which the described filter element is installed.

Filter elements with end face inlets are already known in the art. These filters are wound, for example, from filter layers that are alternately flat and wavy. This creates channels, the alternating seal of which forces the fluid to flow through the filter medium. Accordingly, the medium to be filtered enters through the channels which are open on the end face at the inlet side. Within the filter element, the medium switches to channels that are adjacent to the inlet channels and are open on the discharge side. This causes the fluid to be filtered.

The aim of such a filter configuration on the one hand is to minimize the volume required for the filter element. The end faces of the filter element form an inlet side and a discharge side, respectively. The channels that communicate with the inlet side form the unfiltered side of the filter, while the discharge-side channels form the filtered side. As a result, these filters are very compact and can be installed, for instance, as inline filters in pipes. At the same time, the aim is to increase the filter capacity as far as possible. However, with a wavy configuration of the filter layer this is possible only to a limited extent. It has been shown that in the inlet channels there is little flow in the contact area between the wavy filter layer and the flat filter layer, so that fewer particles are deposited on the filter medium in these areas than in others. Due to the irregular loading of the filter medium, the filter reaches the end of its service life, which is determined by the pressure drop across the filter, at a time when parts of the filter medium have not yet reached their loading limit.

It is also known in the art, for example from WO 87/01301 and U.S. Pat. No. 3,020,977, to use zigzag-folded or pleated filter layers in wound filters. They are intended as spacer layers between the individual filter layers. For this purpose, a filter layer involved in the filtering of the fluid is alternately wound with an additional layer. The additional layer is used, for example, for electrostatically discharging the fluid to be filtered or the particles contained therein (WO 87/01301). The flat layer can furthermore be used to obtain a reliable spacing of the folded layers involved in the filtering (U.S. Pat. No. 3,020,977). For this purpose, the flat layer is introduced into the filter as an additional layer and thus divides the rhombic channels created by the zigzag-folded filter layers in one of the diagonals.

Such filters are expensive to produce, however. Furthermore, only half of the layers are involved in filtering the fluid. As a result, the volume to filter area ratio is not optimized.

SUMMARY OF THE INVENTION

Thus, an object of the invention was to provide an improved filter element with end face inlets and discharge outlets.

Another object of the invention is to prove a filter with end face inlets and discharge outlets which is cost-effective to produce.

A further object of the invention is to provide a filter with end face inlets and discharge outlets which achieves an optimal ratio of filter area and capacity to structural volume.

These and other objects are achieved in accordance with the present invention by providing a filter element with end face inlets and discharge outlets, comprising at least one flat layer and at least one folded layer of filter material through which a fluid to be filtered can pass, wherein the at least one flat layer alternates with the at least one folded layer such that a plurality of adjacent channels having a triangular cross section are formed, some of said channels being inlet channels which are open at an inlet end face of said filter element and others of said channels being discharge channels which are open at a discharge end face of said filter element opposite said inlet end face; tight seals closing the inlet channels at the discharge end face of the filter element and tight seals closing the discharge channels at the inlet end face of the filter element such that a fluid to be filtered, in order to flow through the filter element from the inlet end face of the filter element to the discharge end face, must pass from an inlet channel through one of said layers of filter material into a discharge channel; and means for sealing the inlet side from the discharge side in a mounting location of the filter element, wherein except for sides contiguous with an outer periphery of the filter element, each side of the triangular cross section inlet channels is adjoined by a discharge channel, and vice versa, so that the fluid can flow through the full channel area of the channels except for fold edges at the apexes of the triangular channels.

In accordance with a further aspect of the invention, the objects are also achieved by providing a fluid filter comprising a housing with an inlet and an outlet and having a filter element with end face inlets and discharge outlets as described above arranged in said housing.

The filter element according to the invention comprises at least one flat and one folded layer. The folded layer consists of a folded filter medium, which forms fold edges between the folds. If the filter element is configured as a wound filter, it is sufficient to wind a flat layer alternating with a folded layer. If the filter element is to be block-shaped or rectangular, a plurality of alternating flat and folded filter layers must be stacked on top of each other.

Furthermore, means must be provided at the mounting location to seal the inlet side from the discharge side. The mounting location is, for instance, a filter housing. Another option is to use the filter element as an inline filter in a pipe. The means for installation can vary. It is feasible, for example, to fix the filter element in the mounting location by bonding. Another option is to design the filter element as a replaceable insert, in which case seals must be provided in the mounting location or on the filter element to separate the inlet side from the discharge side.

Both the flat layers and the folded layers of the filter element are involved in the filtering, i.e., they are made of a filter medium. The same or different filter media may be used. Furthermore, at least in the interior of the filter element, i.e., at a certain distance from the edge of the filter element, the channels are sealed such that all three sides of each inlet channel have adjacent discharge channels. Thus, all three sides of each inlet channel are active as filters. This maximizes the dirt collection capacity in relation to the installed filter area of the filter medium.

This effect is further enhanced because the three sides of each channel can be used right up to the corners formed by the fold edges of the filter medium. This can be explained by the triangular cross-section, which, unlike the initially described wavy intermediate layers, does not result in areas in the filter medium that converge at such an acute angle that no measurable fluid flow occurs there. The large filter cross section provided by the filter element of the invention simultaneously minimizes the flow resistance of the filter element.

At the edge of the filter element, the condition that each inlet-side channel should be adjacent to a discharge-side channel can be met only to a limited extent. This is due to the fact that the edge area of the filter element comprises inlet-side channels that are no longer adjoined by a discharge-side channel but by the edge of the filter element. This limitation must be accepted because of the geometry of the filter element.

As described above, the filter element can be produced by rolling the filter layers into a cylinder or by stacking a plurality of flat and folded layers. The cylindrical filter element need not be a circular cylinder. Other shapes, e.g., elliptical shapes, are also feasible. When the layers are stacked, it is possible to form not only cuboid filter elements but also stepped filter elements with filter layers mounted in staggered fashion, or structures that are rotated in space. The wound filter elements can also be rolled into cones, which is the equivalent of stepped layering in cuboid filter elements. Thus, every flow-structure cross-section can be almost completely filled with the filter medium. The available volume is optimally filled.

In accordance with one specific embodiment of the invention, the channels of the filter element are arranged in such a way that six adjacent channels form a hexagonal cross section. In other words, the fold edges of two adjacent folded strips, which are separated by a flat strip, converge in a line. This makes it possible to minimize the amount of filter material that cannot be used for filtering. Of course, the condition that the inlet-side channels should exclusively adjoin discharge-side channels is met even if there is an offset between adjacent folded layers of the filter element. However, the side of the inlet-side channels that is formed by the flat intermediate layer ends in two discharge-side channels that are separated by a fold edge of the folded layer.

According to another specific embodiment of the invention, the channels have a cross section of equilateral triangles. In this case, the above-described advantages regarding the flow through the filter insert are most pronounced. However, the folds of the folded layers can also be pushed together more or pulled further apart. This results in an advantageous packing density of the filter medium in relation to the volume. Thus, to obtain an optimal result, the exact geometry of the filter insert with respect to the fold angles of the folded layer must be determined as a function of the application.

The filter element can advantageously be provided with a filter frame for installation in a housing. The seal, for example, can be fixed to this filter frame to ensure a reliable separation between the inlet side and the discharge side. The filter frame may also serve to give additional stability to the filter element and make it easier to replace the filter element.

The filter element can further be provided with a finish layer or closure layer on the side surfaces located between inlet end face and the discharge end face. This finish layer or closure layer can provide an additional seal or form inlet-side or discharge-side channels in the edge area of the filter element. The finish layer may be made of the same material as the filter medium or of a different material, e.g., a material which forms a finish layer which is impermeable to the fluid.

The invention also relates to a filter in which the described filter insert is installed.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
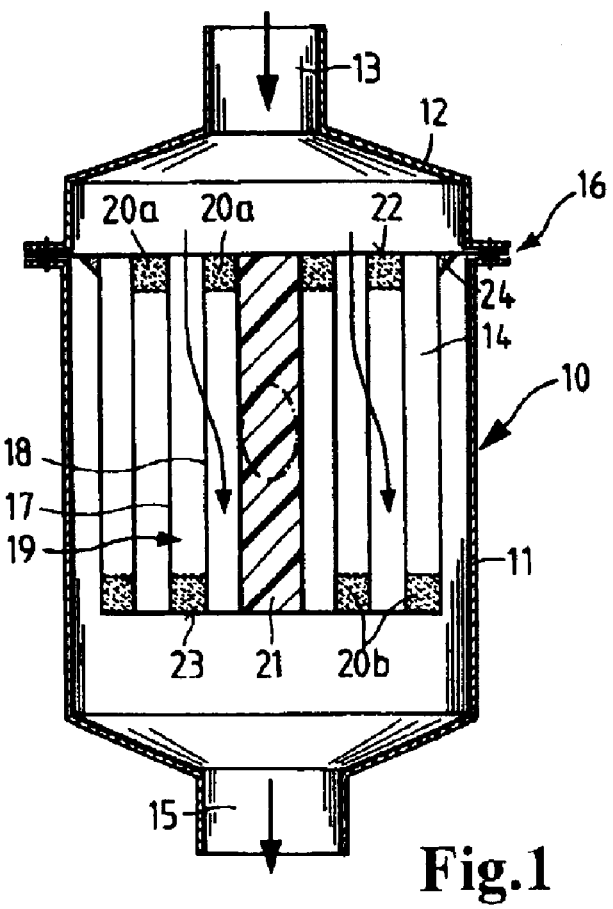
FIG. 1 shows the filter structure in a schematic cross-section through the center of an inline filter with a cylindrical filter element.

FIG. 1 depicts an inline filter with a housing 10 comprising a housing vessel 11 and a cover 12. The cover has an inlet 13 through which the fluid to be filtered flows into the housing in the direction indicated by the arrow. The fluid then flows through a filter insert 14 and through an outlet 15. Filter insert 14 is mounted in a parting plane 16 between the housing vessel 1 land the cover 12 of the housing.

The schematically depicted filter insert 14 is configured as a wound filter. The different layers 17 and 18 form channels 19 through which the fluid to be filtered flows. The channels are alternately sealed by seals or closures 20a and 20b, so that the fluid to be filtered must switch channels as it flows through the filter insert 14. This causes the fluid to be filtered. The layers 17 and 18 are furthermore wound around a core 21 having e.g., an oval cross section, forming a seal.

To produce a reliable separation between an inlet side 22 and a discharge side 23, the filter insert is mounted in a filter frame 24, and the filter frame is clamped into the parting plane 16 of the housing between the housing vessel and the cover.

Figure 2:
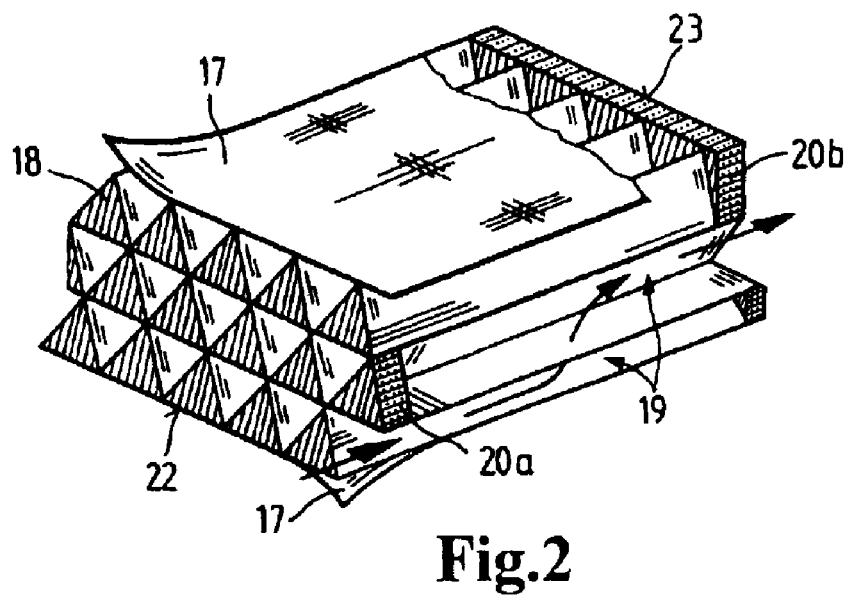
FIG. 2 is a perspective detail view of a filter element with a rectangular configuration.

FIG. 2 shows a detail of a layered filter element with a basically cuboid structure. This element has channels 19 whose cross sections form equilateral triangles. The inlet side 22 and the discharge side 23 are alternately sealed by seals 20*a* and 20*b*, so that the fluid, as it flows through the filter insert, is forced to take the path indicated by the arrows.

The filter element is formed by the alternating arrangement of flat layers 17 and folded layers 18. This creates the walls of the channels. The channels are arranged in such a way that an inlet-side channel has three adjacent discharge-side channels and vice versa. Thus, except for the fold edges themselves, all the available area of the filter material is used for filtering the fluid. This makes it possible to completely avoid the so-called pinch gap that occurs when wave-shaped intermediate layers are used.

Figure 3:
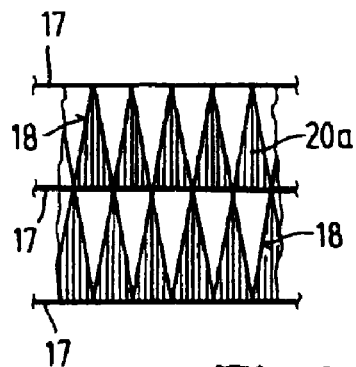
FIG. 3 is a schematic illustration of the folding pattern of five layers, with the folded layers being pushed together.

FIG. 3 shows an alternative embodiment of the folded layers 18. These layers are folded at an angle of less than 60° enabling a greater packing density than is possible with the filter element shown in FIG. 2.

Figure 4:
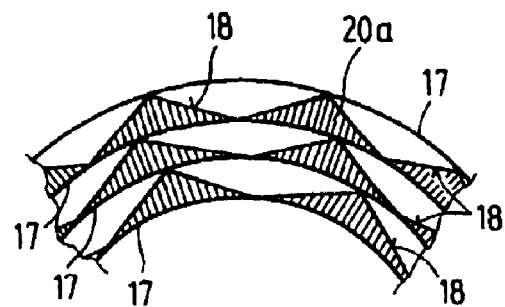
FIG. 4 is a detail view of a cylindrically wound filter element illustrating the folding pattern of seven layers in which the folded layers are pulled apart.

In FIG. 4, the folds are pulled apart to form angles greater than 60°. This figure shows a wound filter by way of example. The figure further shows that even if the fold edges of the folded layers do not meet on the opposite sides of the flat layer, unfiltered-side and filtered-side channels alternate. This wastes only marginally more filter area than in the example according to FIG. 2.

Figure 5:
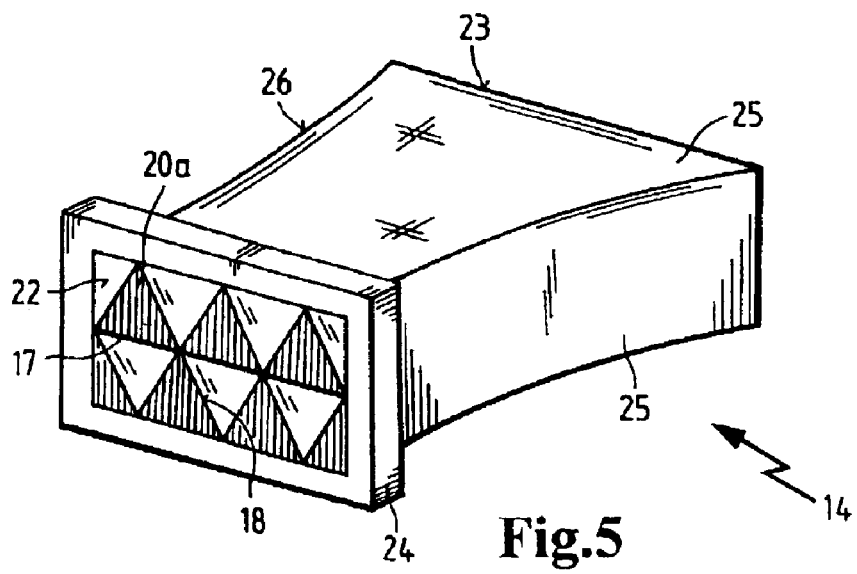
FIG. 5 is a schematic, perspective view of a twisted block-type filter element with filter frame.

FIG. 5 schematically depicts a filter configured as a block. On the inlet side 22 this filter is provided with a filter frame 24 to facilitate installation of the filter in a housing (not shown). The filter insert shown is moreover twisted so that the inlet side and the discharge side of the filter are not in alignment. Such a filter requires the use of a sufficiently elastic filter medium. The filter element is provided with a surrounding finish or closure layer 25, which simultaneously forms an edge 26 of the filter insert.

Figure 6:
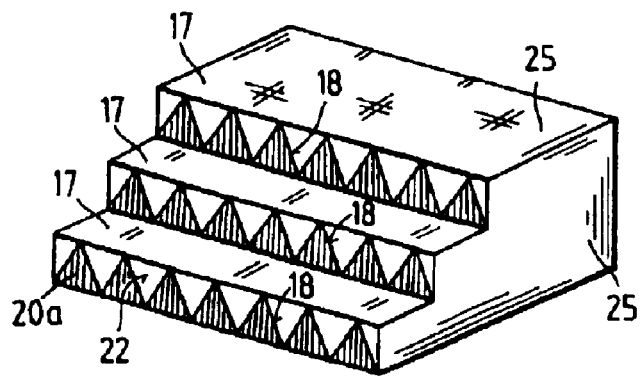
FIG. 6 is a schematic, perspective view of a stepped filter element.

FIG. 6 shows an example in which the layers 17 and 18 are staggered. This creates a stepped filter structure, which may have fluid flow advantages in a corresponding installation in a filter housing (not shown). This filter, too, can be provided with a finish layer 25.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A filter comprising:
    a housing having a housing vessel and a cover; and
    a filter element with end face inlets and discharge outlets, the filter element comprising:
    at least one flat layer and at least one folded layer of filter material through which a fluid to be filtered can pass, wherein the at least one flat layer alternates with the at least one folded layer such that a plurality of adjacent channels having a triangular cross section are formed, some of said channels being inlet channels which are open at an inlet end face of said filter element and others of said channels being discharge channels which are open at a discharge end face of said filter element opposite said inlet end face;
    tight seals closing the inlet channels at the discharge end face of the filter element and tight seals closing the discharge channels at the inlet end face of the filter element such that a fluid to be filtered, in order to flow through the filter element from the inlet end face of the filter element to the discharge end face, must pass from an inlet channel through one of said layers of filter material into a discharge channel; and
    means for sealing the inlet end face from the discharge end face at a mounting location of the filter element,
    wherein except for sides contiguous with an outer periphery of the filter element, each side of the triangular cross section inlet channels is adjoined by a discharge channel, and vice versa, so that the fluid can flow through the full channel area of the channels except for fold edges at the apexes of the triangular channels, and
    wherein the filter element is mounted at the mounting location which is in a parting plane between the housing vessel and the cover.

2. A filter according to claim 1, wherein the filter element is substantially cylindrical and comprises at least one folded layer alternating with a flat layer which have been rolled into a cylindrical shape.

3. A filter according to claim 1, wherein the filter element comprises a plurality of alternately stacked flat layers and folded layers.

4. A filter element according to claim 3, wherein the channels are arranged such that six adjacent channels together form a hexagonal cross section.

5. A filter according to claim 1, wherein the channels have an equilateral triangle cross section.

6. A filter according to claim 1, wherein the individual layers are staggered relative to each other.

7. A filter according to claim 1, wherein the filter element further comprises a filter frame for installation in a housing.

8. A filter according to claim 1, wherein the filter element has a finish layer on lateral surfaces connecting the two end faces.

* * * * *